United States Patent [19]

Souma

[11] Patent Number: 4,732,469
[45] Date of Patent: Mar. 22, 1988

[54] LOW NOISE OPTICAL TIME DOMAIN REFLECTOMETER

[75] Inventor: Masafumi Souma, Oume, Japan

[73] Assignee: Iwatsu Electric Co., Ltd., Tokyo, Japan

[21] Appl. No.: 80,226

[22] Filed: Jul. 29, 1987

Related U.S. Application Data

[63] Continuation of Ser. No. 731,383, May 7, 1985, abandoned.

[30] Foreign Application Priority Data

Aug. 18, 1984 [JP] Japan ................... 59-172158

[51] Int. Cl.[4] ............... G01N 21/88; G01M 11/00
[52] U.S. Cl. .................................................. 356/731
[58] Field of Search ................... 356/73.1; 324/52; 328/63

[56] References Cited

U.S. PATENT DOCUMENTS 4,438,404  3/1984  Philipp ........................... 328/63

FOREIGN PATENT DOCUMENTS 0079938  6/1981  Japan ........................... 356/73.1

*Primary Examiner*—Davis L. Willis
*Assistant Examiner*—S. A. Turner
*Attorney, Agent, or Firm*—Oblon, Fisher, Spivak, McClelland & Maier

[57] ABSTRACT

A time domain reflectometer includes a combined a pulse generator for generating a pulse which is fed to an object under test such as a optical fiber and a sampler for sampling a reflection signal such as a back scattering signal. The pulse generator is controlled by analog delay means and the sampler is controlled by digital delay means. It, therefore, is possible to sample the small back scattering signal and to measure a very long fiber without influences of undesirable signals.

6 Claims, 6 Drawing Figures

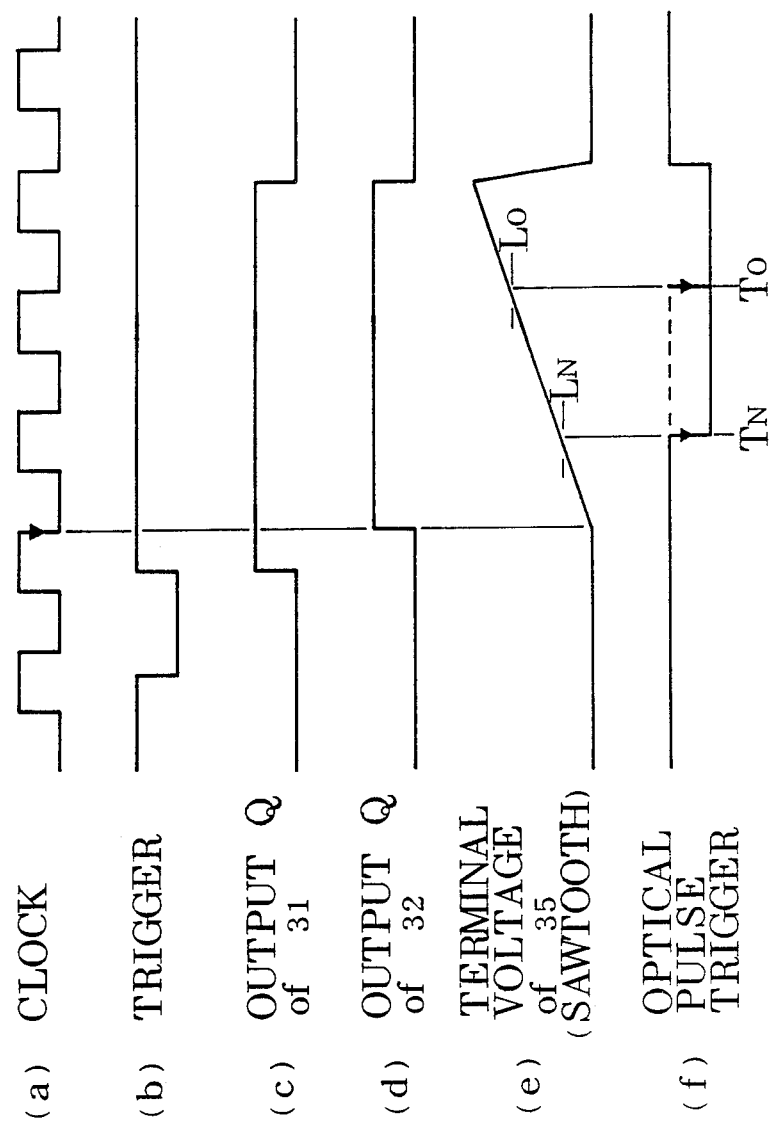

LOW NOISE OPTICAL TIME DOMAIN REFLECTOMETER

This application is a continuation of application Ser. No. 731,383, filed on May 7, 1985, now abandoned.

BACKGROUND OF THE INVENTION

1. Field of the Invention

This invention relates to a time domain reflectometer (TDR) for measuring characteristics, disconnections and discontinuities etc. of a line.

Particularly this invention is intended for the TDR wherein an output pulse is provided to a transmission line and a reflected signal responding to characteristics of many parts of the line is sampled.

Further, this invention is concerned with the high sensitivity TDR wherein the smaller the reflected signal being detectable is, the more effective the application is.

An example of such application is for an optical time domain reflectometer (OTDR) in which a transmission line under test is an optical fiber.

2. Discussion of Background

In prior art TDR's, particularly the conventional OTDR, a measurement of a long fiber has been required and it has been an important problem to be able to detect the value of the small reflected signal, because a fiber having a very small loss has been produced and a long distance transmission with no repeater is possible due to improvements is light emission elements and photo detection elements.

An example of the prior art is shown in No. 58-120316 of Japanese patent application with the declaration of priority of U.S. Pat. No. 4,438,404, wherein a signal sampling system includes a combined digital and analog acquisition time base for accurately sampling and displaying a short duration electrical event superimposed on a long time duration signal. The signal sampling system is intended for use in stimulus-response situations, and both stimulus and response signals are synchronized with the clock of the digital portion of the time base.

The signal sampling system abovementioned has a precision delay generator including a clock, a digital delay generator and an analog delay generator. The digital delay generator generates a stimulus, such as a light impulse, to be sent down an optical fiber and the analog delay generator generates a sampling signal in precise time relationship with the stimulus.

The longer the fiber under measurement, the larger the attenuation of the fiber and the smaller back scattering optical signal of the fiber. A sampler sampling such a small signal is apt to be influenced by noise. A comparator and a sawtooth generator for generating a linear ramp included in the analog delay generator may be such a noise source. the level of the comparator and the amplitude of the linear ramp are varied according to variations of the sampling point, therefore currents of the comparator and the sawtooth generator are varied and the rise time and amplitude of an output waveform of the comparator is varied slightly but not enough not to be measured and furthermore some influences are given to peripheral circuits of the comparator and the sawtooth generator via power lines and ground.

The analog delay generator, including the comparator, sends the sampling signal to the sampler and the sawtooth generator seriously effects the sampler with an input amplifier amplifying the back scattering signal having a gain of 80 dB to 100 dB or more and the amplified back scattering signal is sent to the sampler. In case sampling occurs long after an optical pulse is sent to the long fiber, undesirable effects may occur because the back scattering signal is very small and therefore a waveform reproduced by sampling does not show the true back scattering signal. In order to eliminate the these effects, filters are used in a power supply and tightly sealed circuits are employed, however they are not totally effective.

SUMMARY OF THE INVENTION

An object of this invention is to provide a high sensitivity time domain reflectometer (TDR) which solves the abovementioned problem.

Another object of this invention is to provide an optical time domain reflectometer (OTDR) in which the transmission line under test is an optical fiber.

A further object is to provide an OTDR capable of accurately reproducing an extremely small back scattering signal and reflected signal occurring long after an optical pulse is sent to the long fiber, which signals are sufficiently amplified and sampled without the abovementioned disadvantages.

An additional object is to provide an OTDR wherein a sampling signal is fixedly generated by a stable crystal-controlled clock and an optical pulse trigger is movably generated with a very short time shift at every sampling.

It is still a further object to provide

A time domain reflectometer comprising:

clock means for generating clock edges at a predetermined frequency;

digital delay means for generating a sampling signal upon receipt of a predetermined number of the clock edges according to delay data;

analog delay means for generating a pulse trigger at the end of a predetermined period according to delay data after receipt of the first clock edge;

pulse generating means for generating a pulse upon receipt of said pulse trigger;

coupling means for sending said pulse to an object under test and taking out a reflection signal from the object;

sampling means for sampling said reflection signal upon the instant of receipt of said sampling signal;

analog to digital converting means for converting an analog output of said sampling means to a digital value; and control means for which includes, memory means for memorizing output data of said analog to digital converting means, and processing means for processing the delay data being sent out to said digital delay means and said analog delay means, and for processing the output data memorized in said memory means, whereby data of said object under test is obtained.

These and other objects, advantages, features, and uses will become more apparent as the description proceeds, when considered with the accompanying drawings.

BRIEF DESCRIPTION OF THE DRAWINGS

FIG. 6 is a waveform ladder diagram for explaining the operation of the analog delay generator of FIG. 5.

DESCRIPTION OF THE PREFERRED EMBODIMENTS

Figure 1:
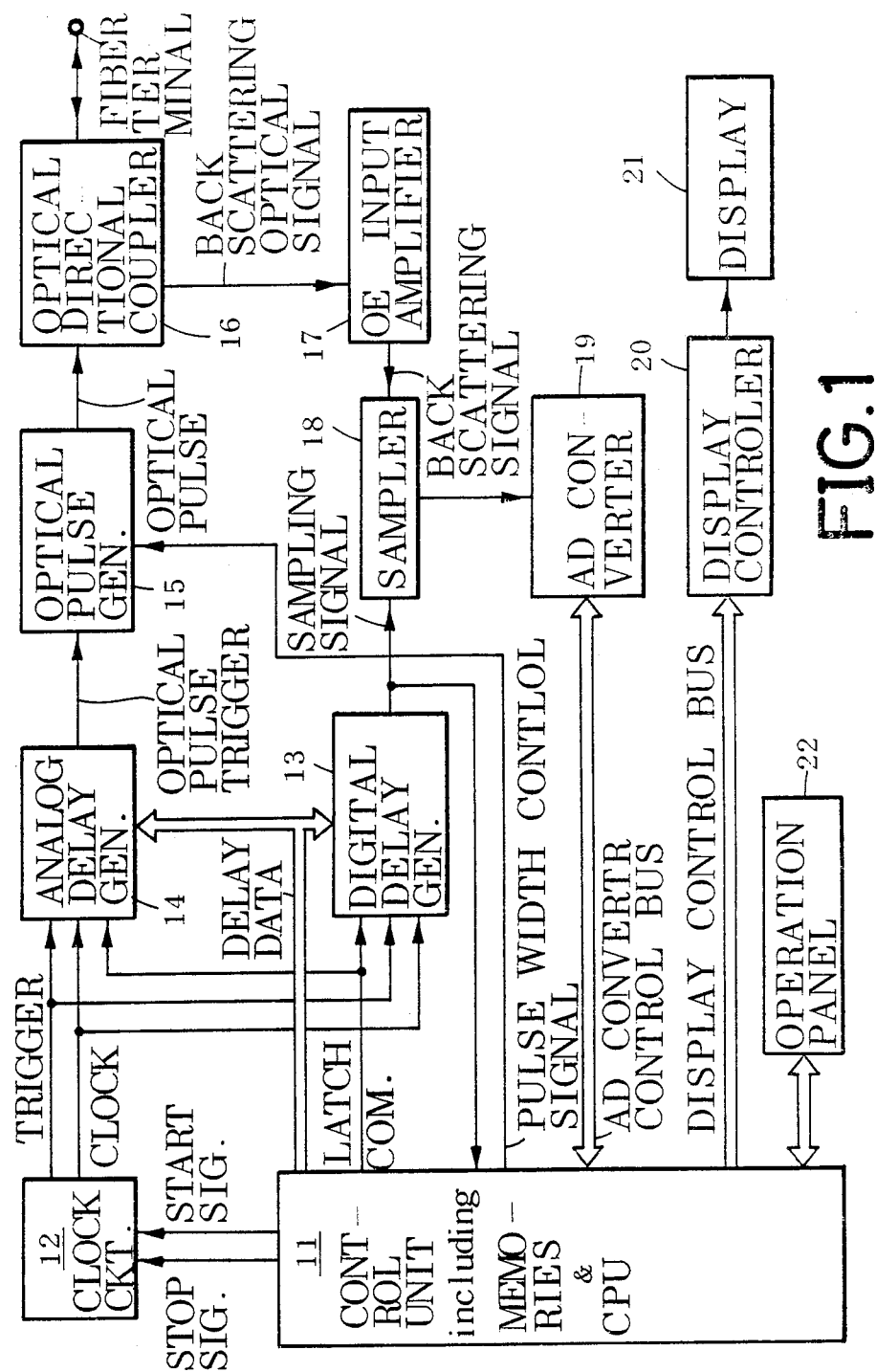
FIG. 1 is a block diagram of an optical time domain reflectometer (OTDR) in accordance with the present invention.

With reference to FIG. 1 showing an embodiment of the present invention constructed as an optical time domain reflectometer (OTDR), reference numeral 11 indicates a control unit including memories and a microprocessor for controlling other elements and for processing signals therein; 12 designates a clock circuit for generating a stable crystal-controlled 5-megahertz clock, and starting and stopping in order to generate a trigger of about 3-kiloherz which is controlled by a start signal and a stop signal provided from the control unit 11; 13 identifies a digital delay generator for generating a sampling signal synchronizing with the clock from the clock circuit 12 when clock pulses are counted by a predetermined number according to delay data and a latch command from the control unit 11; 14 denotes an analog delay generator for generating an optical pulse trigger, wherein a sawtooth is generated when a trigger and a clock are fed from the clock circuit 12 thereto, and the optical pulse trigger is generated when the sawtooth rises across a level predetermined by delay data and a latch command from the control unit 11; 15 represents an optical pulse generator for generating an optical pulse which has a pulse width of 10 to 160 nanoseconds, which is triggered by the optical trigger pulse from the analog delay generator 14, buy a pulse width control signal from the control unit 11; 16 identifies an optical directional coupler for sending the optical pulse from the optical pulse generator 15 to a fiber which is measured by a fiber terminal and for branching off a back scattering optical signal and a reflected optical signal from the fiber; 17 shows an OE input amplifier having an optical to electrical conversion element, for example, an avalanche photo diode (APD) and an amplifier of a high gain of 100 dB or more which is usually a logarithmic amplifier because a wide dynamic range is required; 18 refers to a sampler for sampling the back scattering signal from the OE input amplifier 17 by the sampling signal from the digital delay generator 13; 19 indicates an analog to digital converter (AD converter) for converting a sampled signal from the sampler 18 to a digital value; 20 designates a display controller for controlling a display 21 which is cathode ray tube display (CRT) for showing processed data and signals via a display control bus from the control unit 11 which memorizes the output of the AD converter 19 into the memory included therein and processes to average the memorized data etc.; and 22 identifies an operation panel for setting and changing measuring items to be given to the control unit 11.

Figure 2:
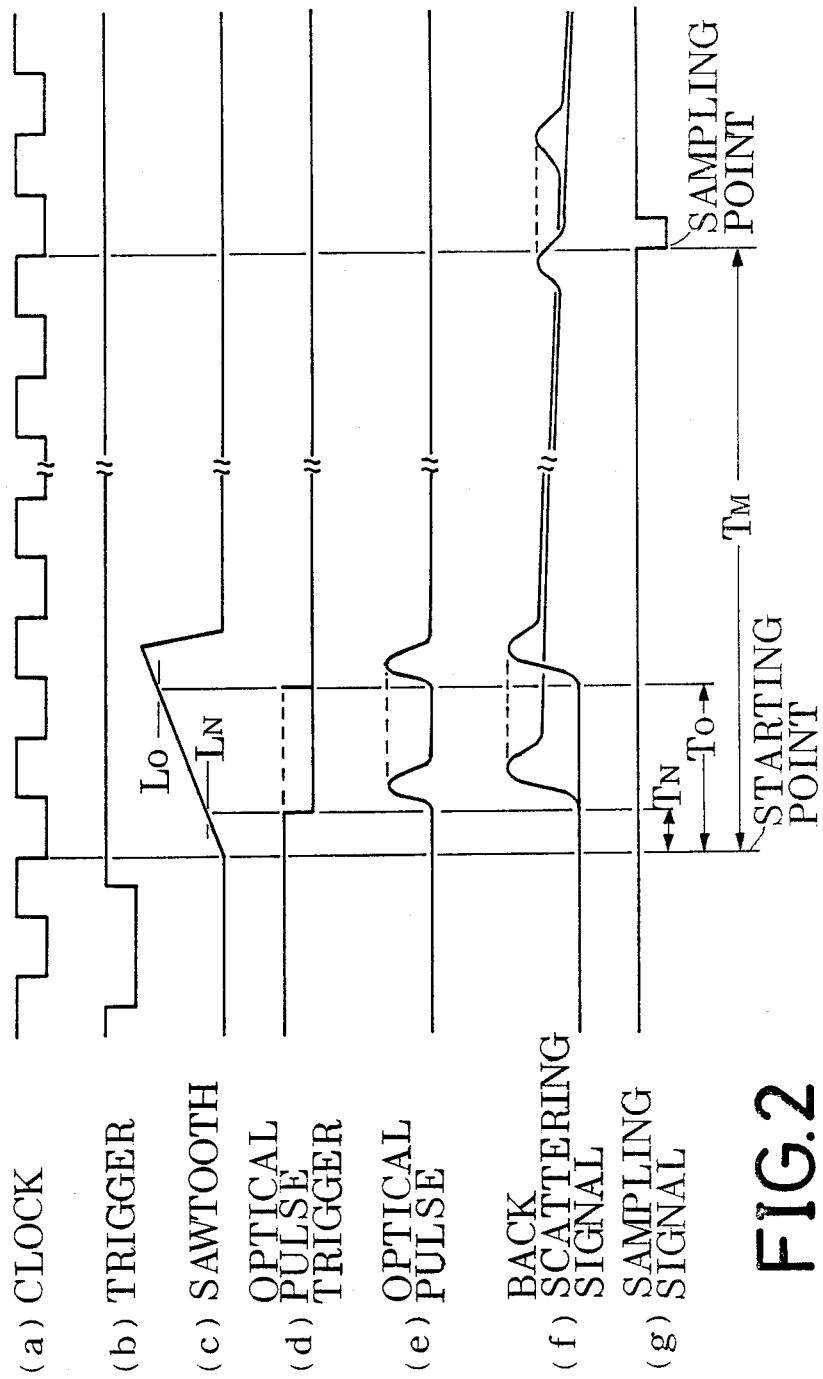
FIG. 2 is a waveform ladder diagram for explaining the operation of the OTDR of FIG. 1.

Referring to FIG. 2, there is shown waveform ladder diagram explaining the operation of the OTDR of FIG. 1.

When the clock (a) and the trigger (b) are sent to the analog delay generator 14, the sawtooth (c) having a constant slope is started by a trailing edge of the clock (a) just after the trigger (b) being added thereto. When the sawtooth (c) rises across a level $L_N$, an optical pulse trigger (d) is generated. Then, the level $L_N$ is set buy delay data from the control unit 11. For example, the clock (a) has a period of 200 nS (repetition frequency 5 megaherz), N of the level $L_N$ are numbers from 0 to 1023 (10 bits) and the slope of the sawtooth (c) is set by 200 nS/1024 $\approx$ 195 pS (picoseconds) per 1 count. If the N is changed by the delay data from the control unit 11, a time $T_N$ (based on a starting point of the sawtooth (c)) of a generation of the optical pulse trigger (d) from the analog delay generator 14 is variable to 10 bits by a step of 195 pS per 1 count. When N equals to zero, the sawtooth (c) rises across a level Lo and the optical pulse trigger (d) is generated at a time To based on the starting point of the sawtooth (c).

The digital delay generator 13 fed the clock (a) generates the sampling signal (g) to be send to the sampler 18 when M pulses of the clock (a) are counted from the starting point according to the delay data from the control unit 11, therefore the sampler 18 samples the back scattering signal (f). Here, the M is variable, for instance, to 16 bits and a time $T_M$ from the starting point to the sampling point is variable by a 200 nS step of the clock period. The maximum $T_M$ comes from a transmission time of about 5 microseconds per 1 kilometer in the fiber.

If the M and N are set, a time $T_D$ from the optical pulse to the sampling point is, as shown in FIG. 2, $$T_D = T_M - T_N$$

wherein $T_D$ is variable to 26 bits by the step of 195 pS per 1 count. Here, $$T_O - T_N \approx N \times 195 \text{ pS}$$

$$T_M = M \times 200 \text{ nS}$$

Thus, the back scattering signal (f) is sampled by the step of 195 pS according to the variable $T_D$ and the sampled signal from the sampler 18 is converted to digital data by the AD converter 19 which digital data is memorized into the control unit 11.

The abovementioned operation is repeated by the approximately 3 kilohertz trigger clock circuit 12, to which the start signal from the control unit 11 is fed. The control unit 11 interrupted by the sampling signal from the digital delay generator 13 computes the present $T_D$ and thereafter calculates the $T_D$ of the next sampling to send out the delay data.

When the operations which memorize the data from the AD converter 19 are repeated a predetermined number of times, the control unit 11 sends out the stop signal and the output of the trigger is stopped to terminate sampling. The memorized data in the memory of the control unit 11 are averaged therein and displayed on the display 21 through the display controller 20. When the averaging process is employed, the same points of the back scattering signals, which are repeated a predetermined number of times, are sampled, meanwhile the $T_D$ is not changed. Such an averaging process is effective to eliminate a random noise "which provides effective filtering and smoothing operations".

Figure 3:
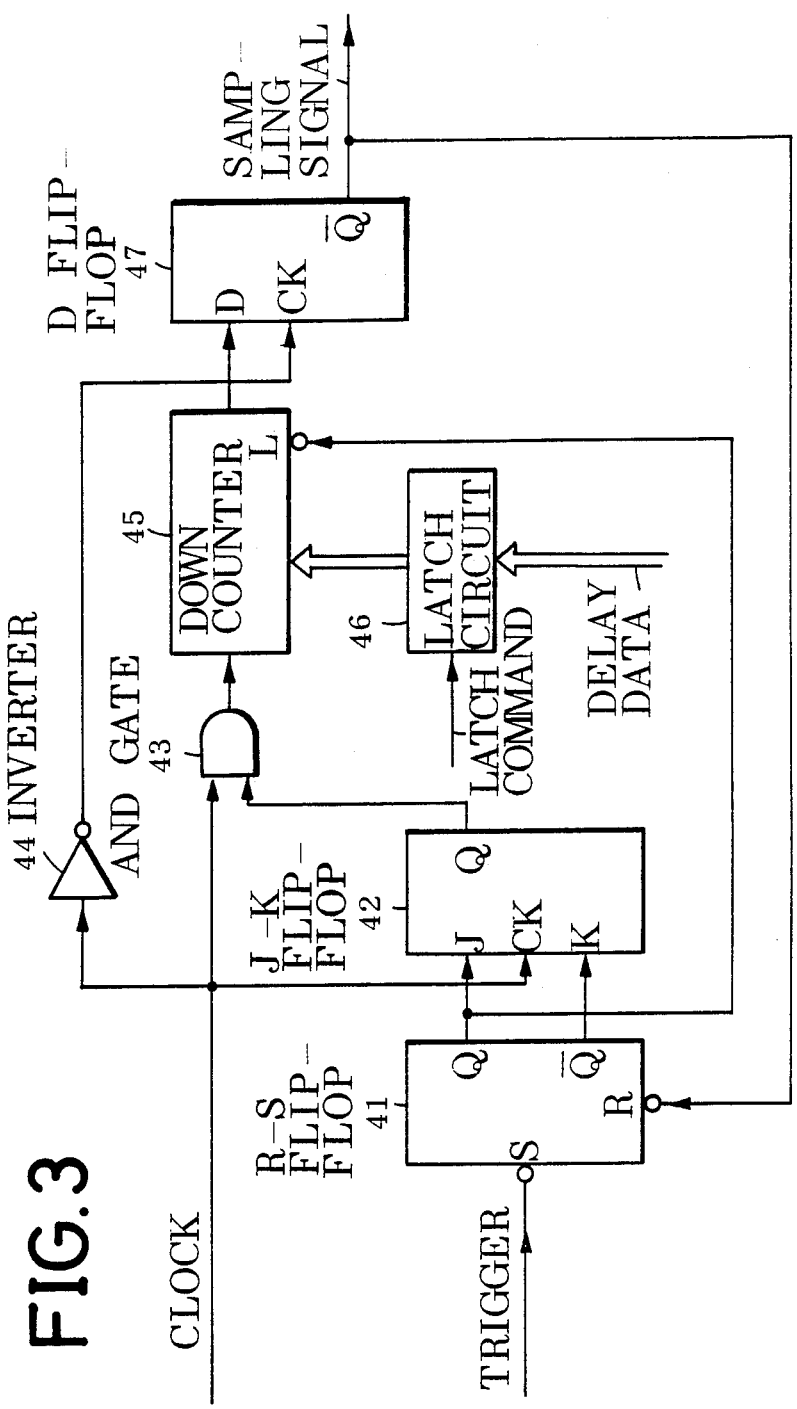
FIG. 3 is a schematic diagram of the digital delay generator of FIG. 1.
Figure 4:
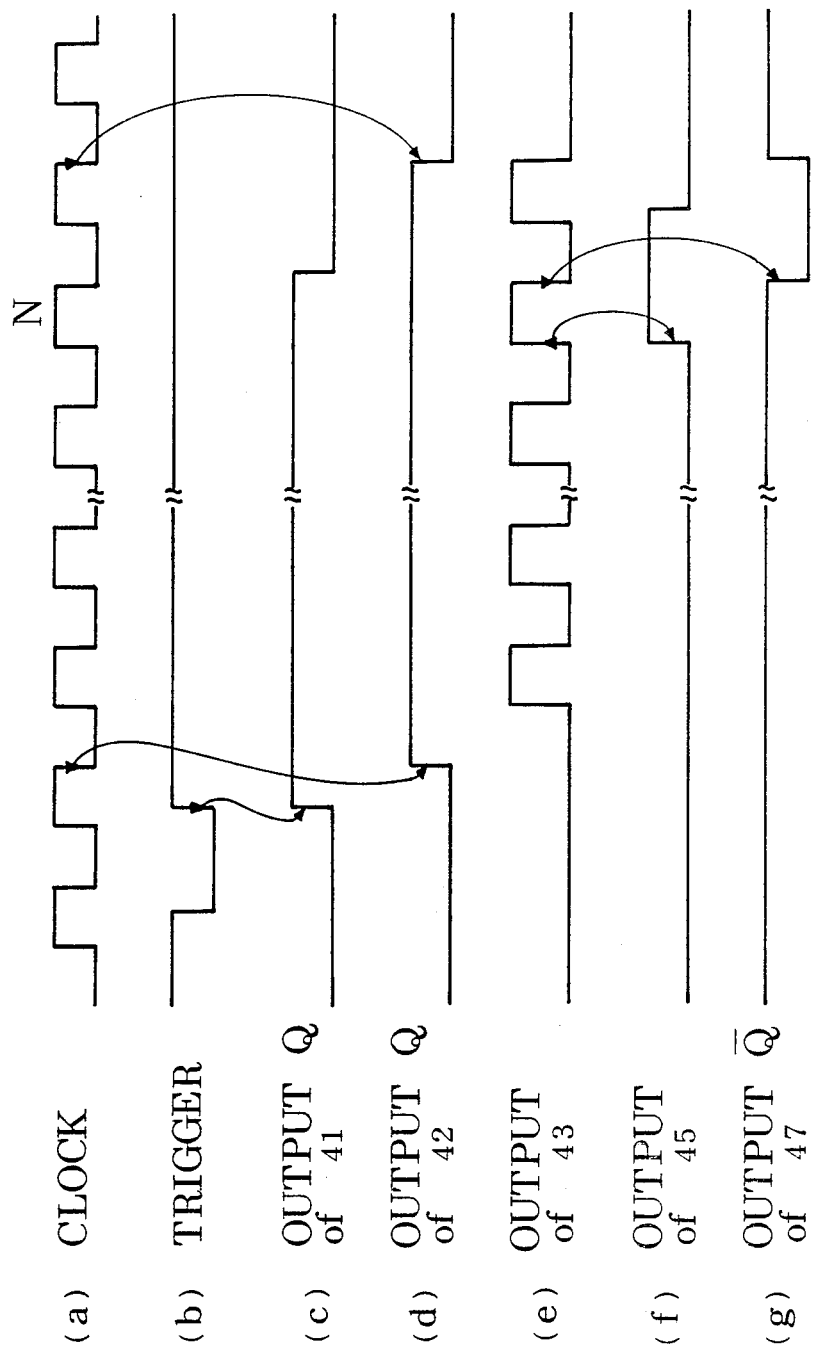
FIG. 4 is a waveform ladder diagram for explaining the operation of the digital delay generator of FIG. 3.
Figure 5:
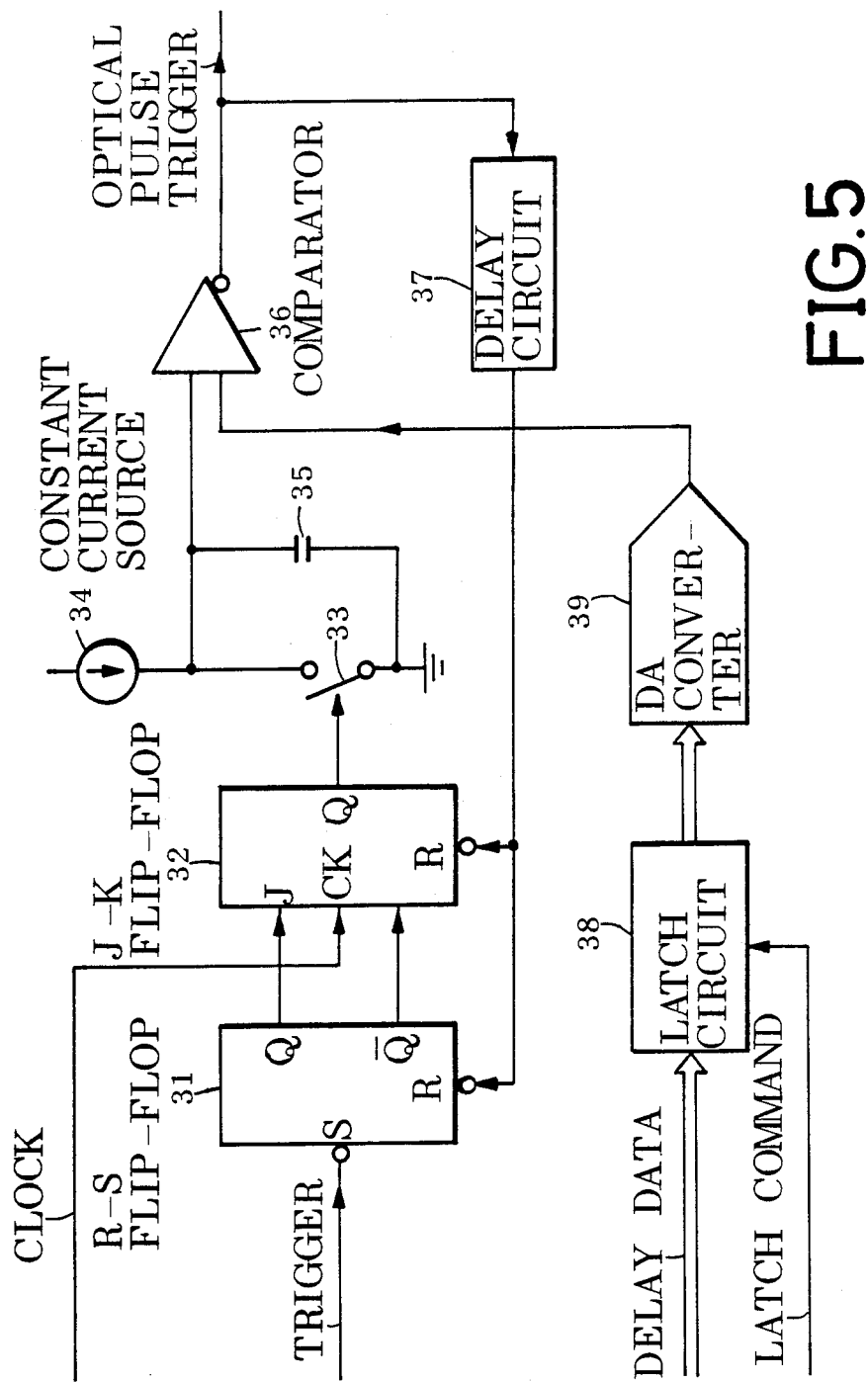
FIG. 5 is a schematic diagram of the analog delay generator of FIG. 1.

Schematic diagrams of the digital delay generator 13 and the analog delay generator 14 which are important elements of this invention are respectively shown in FIG. 3 and FIG. 5, and their waveform ladder diagrams are respectively shown in FIG. 4 and FIG. 6.

Referring to FIG. 3 and FIG. 4, the clock (a) is fed to an AND gate 43, the trigger (b) is added to a R-S flip-flop 41 whose output (c) is sent to a J-K flip-flop 42 to generate an output (d) and the output (d) is provided to an AND gate 43 whose output (e) is transmitted to a down counter 45. The delay data from the control unit 11 are latched onto a latch circuit 46 by the latch command from the control unit 11 and the latched delay data are loaded into the down counter 45. When the down counter 45 which is fed to the clock (a) through the AND gate 43 counts the predetermined numbers M of pulses of the clock (a), the down counter 45 sends an output (f) to a D flip-flop 47 which is added the clock (a) via an inverter 44 to obtain the sampling signal (g), whereby the R-S flip-flop 41 is reset and waits the following trigger.

In the analog delay generator 14 being shown in FIG. 5 and FIG. 6, the trigger (b) is fed to a R-S flip-flop 31 to generate an output (c). The output (c) is sent to a J-K flip-flop 32 to which the clock (a) is added in order to generate an output (d). Being provided the output (d), a switch 33, which has been on theretofore, is switched off. Hereupon, a capacitor 35 is charged up by a current from a constant current source 34, whereby the sawtooth (e) is generated to be fed to one of the terminals of a comparator 36. Furthermore, the latch command and delay data from the control unit 11 are sent to a latch circuit 38 in order to set an output level of a DA converter 39 (digital to analog converter). The output level is transmitted to another terminal of the comparator 36 to be compared with the sawtooth (e). When the sawtooth (e) rises up across the level $L_N$ being set by the delay data value N, the comparator 36 generates the optical pulse trigger (f) to trigger the optical pulse generator 15. A part of the optical pulse trigger (f) is fed back to the two flip-flops 31 and 32 through a delay circuit 37 to reset them. In the abovementioned operation, the N is 10 bits (0 to 1023), and therefore the $L_N$ has 1024 steps, too, wherein 1 step is 195 pS.

According to the present invention, the sampler 18 and the OE input amplifier 17 are not subject to the detrimental effects of the operation of the analog delay generator 14, because the optical pulse generator 15 is actuated by the output of the analog delay generator 14 and the sampler 18 is stimulated by the output of the digital delay generator 13 synchronizing with the clock. If something of noise synchronizing with the clock comes into the OE input amplifier 17 and the sampler 18, a dc offset of the output of the sampler 18 is only changed by a constant value, therefore there is no error.

Even if an undesirable signal caused by the operation of the analog delay generator 14 enters the OE input amplifier 17 and the sampler 18, the continuation of the undesirable signal is only for a short period after the optical pulse being transmitted. The other side, for the short period, the back scattering signal comes from a short distance of the fiber under test, therefore the back scattering signal has enough amplitude to be measured without the influence of the undesirable signal. Further, there is no influence due to the undesirable signal, because the undesirable signal stops until the time when the back scattering signal becomes very small. It is therefore possible to sample the significantly small back scattering signal and to measure a longer fiber in comparison with prior arts.

While the preferred form of the present invention has been described, it is to be understood that modifications will be apparent to those skilled in the art without departing from the spirit of the invention.

The scope of the invention, therefore, is to be determined solely by the following claims.

What is claimed is:

1. A low noise optical time domain reflectometer comprising:
    clock means for generating clock edges at a predetermined frequency;
    digital delay means for generating a sampling signal upon receipt a predetermined number of the clock edges according to delay data;
    analog delay means for generating a pulse trigger at the end of a predetermined period according to the delay data after receipt of the first clock edge;
    pulse generating means for generating a pulse upon receipt of said pulse trigger;
    coupling means for sending said pulse to an object under test and taking out a reflection signal from the object;
    sampling means for sampling said reflection signal upon the instant of receipt of said sampling signal without being affected by noise which comes from said analog delay means;
    analog to digital converting means for converting an analog output of said sampling means to a digital value; and
    control means which includes,
    memory means for memorizing output data of said analog to digital converting means, and
    processing means for processing the delay data being sent out to said digital delay menas and said analog delay means, and for processing the output data memorized in said memory means,
    whereby data of said object under test are obtained.

2. A low noise optical time domain reflectometer in accordance with claim 1 wherein said sampling means comprises;
    an input amplifier for amplifying said reflection signal taken out by said coupling means and
    a sampler for sampling an output of said input amplifier.

3. A low noise optical time domain reflectometer in accordance with claim 1 wherein said analog delay means comprises;
    a sawtooth generator for generating a sawtooth initiated upon receipt of said clock edge, and
    a comparator which receives said sawtooth at an input thereof and a voltage level established by the delay data at another input thereof, and generates said pulse trigger when said sawtooth and said voltage level are equal.

4. A low noise optical time domain reflectometer in accordance with claim 1 wherein said pulse generating means includes an optical pulse generator for generating optical pulse, said coupling means includes an optical directional coupler, and said sampling means includes OE transducing means for transducing optical to electrical, an input amplifier for amplifying an output of said OE transducing means and a sampler for sampling an output of said input amplifier.

5. A low noise optical time domain reflectometer in accordance with claim 2 wherein said input amplifier includes a logarithmic amplifier.

6. A low noise optical time domain reflectometer in accordance with claim 4 wherein said OE transducing means includes an avalanche photodiode and said input amplifier includes a logarithmic amplifier.

* * * * *